UNITED STATES PATENT OFFICE.

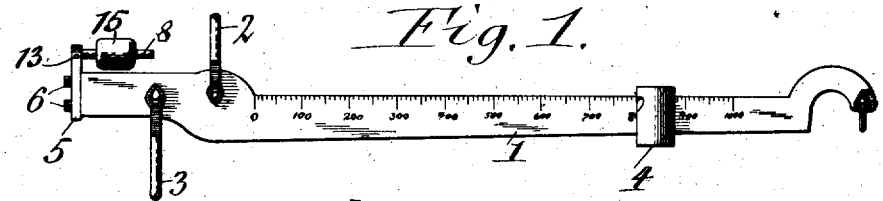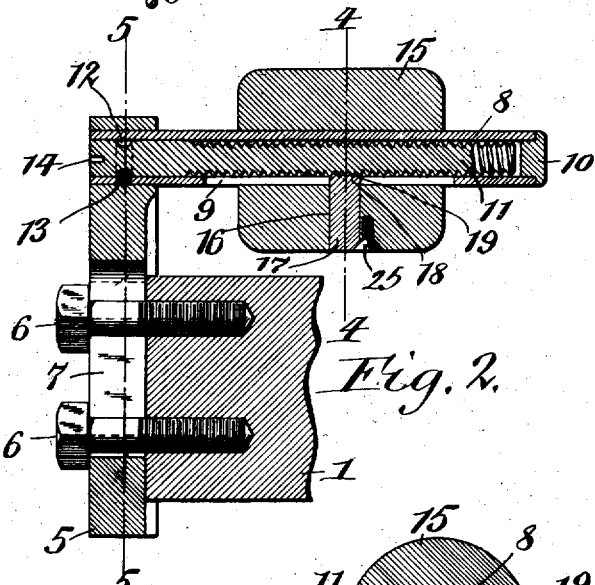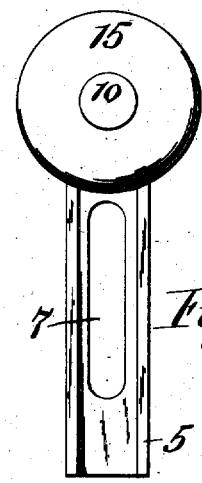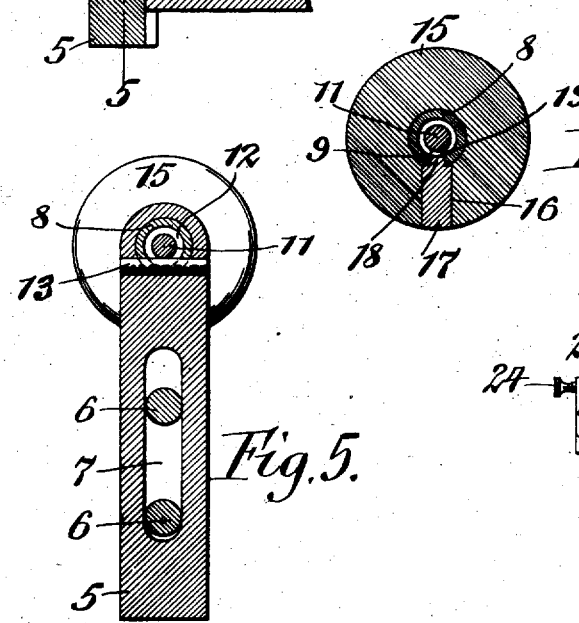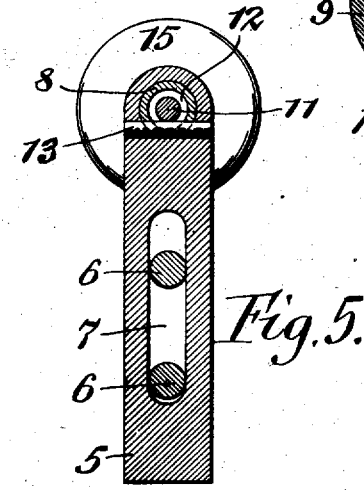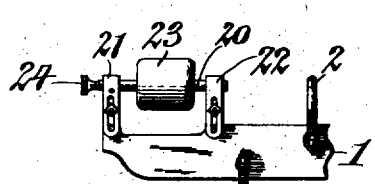

CHARLES A. VIDINGHOFF, OF BUFFALO, NEW YORK.

SCALE-BALANCING DEVICE.

1,018,456. Specification of Letters Patent. Patented Feb. 27, 1912.

Application filed September 25, 1911. Serial No. 651,041.

*To all whom it may concern:*

Be it known that I, CHARLES A. VIDINGHOFF, a citizen of the United States, residing at Buffalo, in the county of Erie and State of New York, have invented new and useful Improvements in Scale-Balancing Devices, of which the following is a specification.

This invention relates to a balancing device which is more particularly designed for that class of scales in which a vertically vibrating beam is employed. Heretofore the balance balls in scales of this type have usually been mounted upon a horizontal externally screw threaded rod which was carried by the beam and engaged its thread with an internally screw threaded opening in the balance ball so that upon turning the ball in one direction or the other its position lengthwise of the beam could be shifted to properly balance the scale before the same was put into use. The objection to this manner of mounting the balance ball on the beam is that it frequently fitted quite loosely on the ball rod so that it could be turned readily by hand or would be turned by the vibration of the scale, the ball being shifted in the last mentioned manner owing to the ball being out of true. In this prior construction therefore the accuracy of the scale was often disturbed and it also afforded easy opportunity for deliberately throwing the scale out of balance by persons intending to weigh fraudulently.

It is the object of this invention to provide a scale balancing device of this character in which the balance ball cannot be easily shifted by hand nor by the vibrations of the scale but which necessitates the use of some tool so that after being set the same will reliably and securely hold the balance ball in position and thereby preserve the accuracy of the scale.

In the accompanying drawings: Figure 1 is a side elevation showing one form of my improved scale balancing device applied to a scale having a single beam. Fig. 2 is a fragmentary vertical longitudinal section, on an enlarged scale, showing my improved balancing device applied to the heel of the scale beam. Fig. 3 is an end elevation of the balancing device detached from the beam. Figs. 4 and 5 are vertical cross sections in the correspondingly numbered lines in Fig. 2. Fig. 6 is a fragmentary side elevation of a scale beam equipped with a slightly modified form of scale balancing device embodying my invention.

Similar characters of reference indicate corresponding parts throughout the several views.

Although my invention is represented in the drawings as applied to a scale having but one beam it is obviously applicable to scales having a plurality of beams.

Referring to Figs. 1 and 2, 1 represents a scale beam which is suspended by an upper beam loop 2 from the usual beam hook and connected by a lower beam loop 3 with the beam rods which connect with the levers as is usual in the construction of scales of this type. 4 represents the horizontally slidable poise mounted on the front part of the scale beam. At its rear end or heel the scale beam has secured thereto an upright supporting bracket or bar 5 the connection between the beam and bracket being preferably so constructed as to permit this bracket to be adjusted vertically on the beam. The preferred means for effecting this adjustment shown in Figs. 1, 2, 3 and 5 of the drawings comprise two tap bolts or screws 6 secured to the heel end of the beam and extending through a vertical slot 7 in the lower part of the bracket, but any other suitable means may be used for this purpose if desired. 8 represents a ball rod which in the construction shown in Figs. 1 and 2 is of tubular form and arranged horizontally above the heel of the scale beam and arranged at its rear end in a horizontal opening in the upper part of the bracket. On one side, preferably the lower side, the ball rod is provided with a longitudinal slot 9 which preferably stops short of the ends of the same. At its front end the ball rod may, if desired, be closed, the means for this purpose shown in Fig. 2 consisting of a plug 10 which may be secured in the front end of the ball rod either by means of a friction, or driving fit, or any other suitable way.

Within the ball rod is arranged an adjusting shaft 11 which is journaled at its rear end within the rear end of the bore of the tubular ball rod while its front end is provided with an external screw thread, so that this shaft forms an adjusting screw. The thread of this adjusting screw may be of any suitable shape, the same for example being shown in Fig. 2 of V-shaped form although any other suitable form will answer the purpose. The adjusting screw is capable of turning in the ball rod but is incapable of moving lengthwise in the same, the means whereby this is accomplished consisting preferably of a circumferential groove 12 formed in the periphery of the adjusting screw at the rear end thereof and a locking pin 13 passing tangentially through the rear part of the ball rod and projecting through one side of the groove 12. This pin also extends through openings in the adjacent part of the bracket whereby this pin connects the bracket ball rod and adjusting screw and at the same time prevents longitudinal movement of the adjusting screw but permits rotary movement thereof. Any suitable means may be provided for turning the adjusting screw, for instance, a slot or nick 14 arranged crosswise in the outer or rear end of the adjusting screw and adapted to receive the end of a screw driver or similar tool for turning the same.

15 represents a balance ball which is capable of sliding lengthwise on the exterior of the ball rod for the purpose of balancing the scale. This ball may be of any suitable shape and the same is mounted upon the ball rod by providing the ball with a horizontal cylindrical opening which receives the front part of the ball rod.

In its lower part the balance ball is provided with a radial opening 16 which is transversely in line with the slot of the ball rod and is preferably of cylindrical form. Within this opening is arranged the outer cylindrical enlarged part 17 of a key, the inner contracted part 18 of which projects upwardly through the longitudinal slot in the underside of the ball rod and is provided at its upper end with one or more sectional or partial screw threads 19 forming in effect a section of a screw nut. This sectional screw thread of the key engages with the underside of the screw thread on the adjacent part of the adjusting screw, the key being held in its operative position within the opening of the balance ball by means of friction, or by means of a screw 25 working in a threaded opening in the underside of the balance ball and having its head overlapping the outer end of a key, or by any other suitable means.

Upon turning the adjusting screw in one direction or the other the key by engagement of its threaded portion with the thread of the adjusting screw is caused to move lengthwise of the screw thereby causing the balance ball to slide lengthwise on the ball rod. After the balance ball is adjusted to the desired position the same will not be disturbed by any vibrations of the scale nor can the same be shifted readily excepting by the use of tools adapted to fit the special construction of the rear end of the adjusting screw.

By carrying the key of the balance ball through the slot of the ball rod and providing a screw connection between the same and the adjusting screw, this key serves the double purpose of operatively connecting the balance ball with the adjusting screw so that the rotary movement of the latter shifts the ball lengthwise of the balance rod, while at the same time the key working in the longitudinal slot of the ball rod prevents the ball from turning on the rod.

It will thus be apparent that my improved construction of scale balancing device prevents easy tampering with the accuracy of the scale as well as accidental displacement thereof as is possible in the scale balancing devices as heretofore constructed.

In the modified construction of the scale balancing device the ball rod 20 is mounted at both ends on the scale beam by means of two brackets 21, 22, the balance ball 23 is mounted on the ball rod between the brackets, and the adjusting screw is provided at one end with a knurled thumb piece or button 24 for manipulating this screw.

I claim as my invention:

1. A scale comprising a beam, a tubular ball rod mounted on the beam and provided with a longitudinal slot, a balance ball slidable lengthwise on the exterior of said rod, a movable shifting member arranged within said rod, and means connecting said shifting member and balance ball and arranged within said slot.

2. A scale comprising a beam, a tubular ball rod mounted horizontally on the beam and provided with a longitudinal slot, a balance ball slidable lengthwise on the exterior of the rod, a screw arranged on the interior of the rod and capable of turning but held against moving lengthwise, and a key arranged in said slot and connected with said ball and provided with a screw thread which engages with the threads of said screw.

3. A scale comprising a beam, a tubular ball rod mounted horizontally on the beam and provided with a longitudinal slot, a balance ball slidable lengthwise on the exterior of the rod and provided with a laterally extending opening transversely in line with the slot of the ball rod, a screw arranged lengthwise on the interior of said rod and capable of turning but incapable of moving lengthwise therein, and a key having a wide outer part secured in the lateral opening of the balance ball and a narrow inner part which extends through the longitudinal slot of said rod and is provided with a sectional screw thread which engages with the thread of said screw.

Witness my hand this 22nd day of September, 1911.

CHARLES A. VIDINGHOFF.

Witnesses:
  THEO. L. POPP,
  ANNA HEIGIS.

Copies of this patent may be obtained for five cents each, by addressing the "Commissioner of Patents, Washington, D. C."